Dec. 22, 1953   C. W. SAVITZ   2,663,380
ROTARY ELECTROSTATIC FILTER
Filed March 14, 1951   5 Sheets-Sheet 1

INVENTOR.
CHRISTIAN W. SAVITZ
BY
Hyde, Meyer, Baldwin & Doran
ATTORNEYS

INVENTOR.
CHRISTIAN W. SAVITZ

Dec. 22, 1953　　　　　　　　C. W. SAVITZ　　　　　　　2,663,380
ROTARY ELECTROSTATIC FILTER
Filed March 14, 1951　　　　　　　　　　　　　　　　5 Sheets-Sheet 3
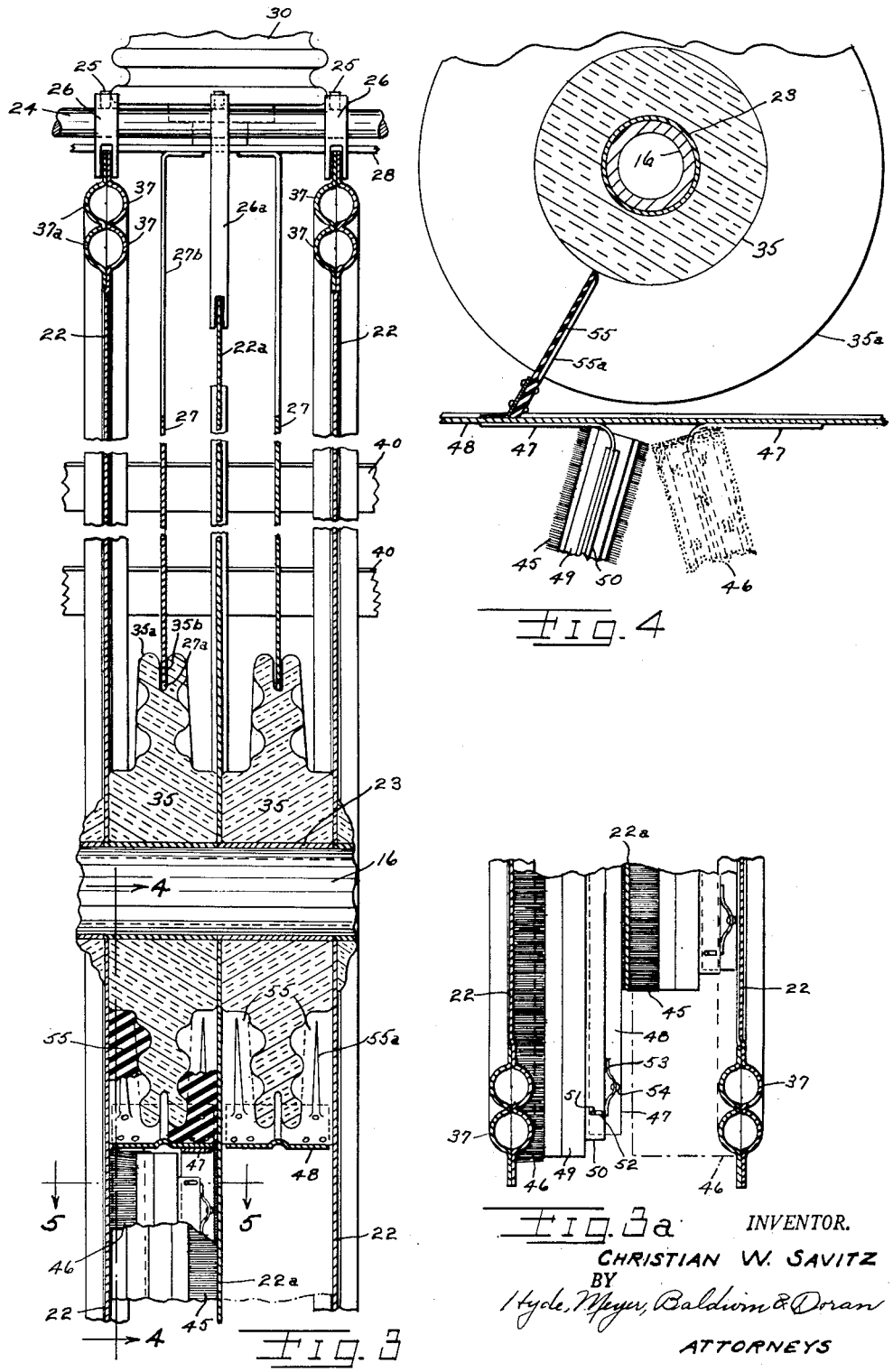
INVENTOR.
CHRISTIAN W. SAVITZ
BY Hyde, Meyer, Baldwin & Doran
ATTORNEYS Dec. 22, 1953    C. W. SAVITZ    2,663,380
ROTARY ELECTROSTATIC FILTER
Filed March 14, 1951    5 Sheets-Sheet 4
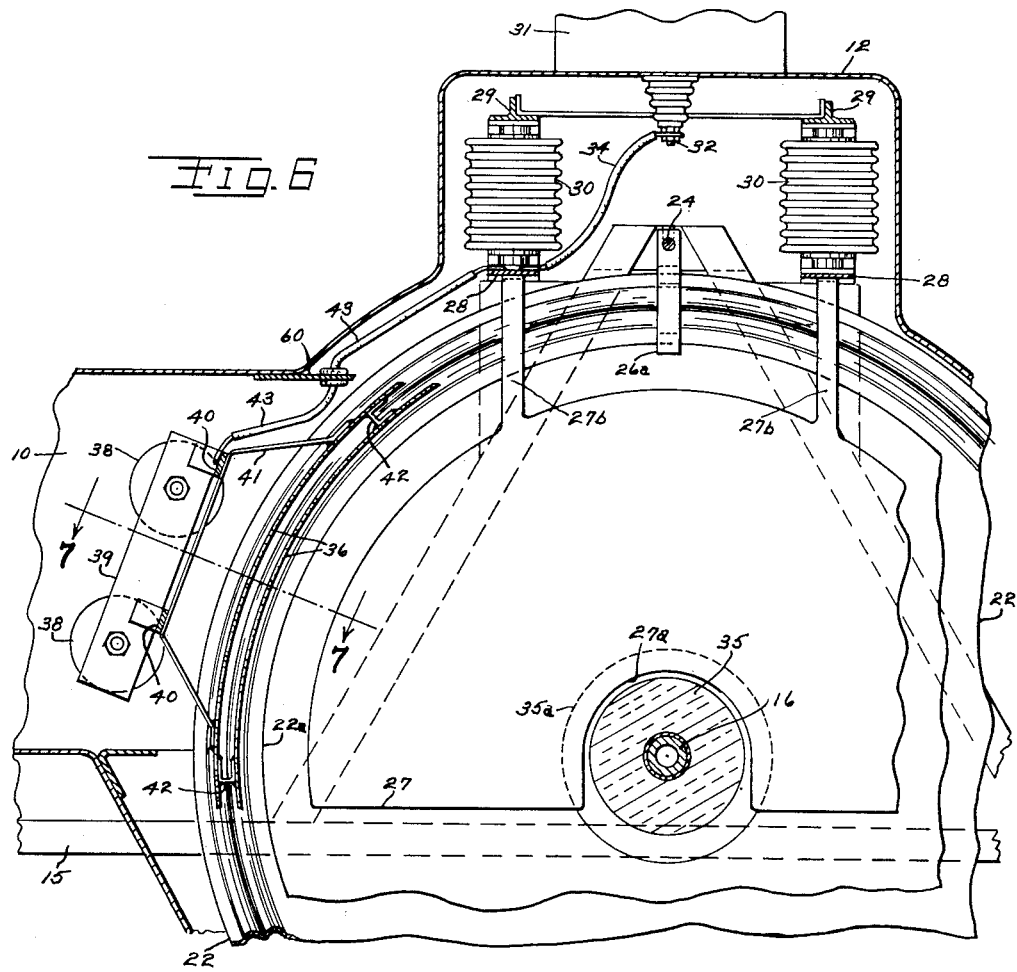
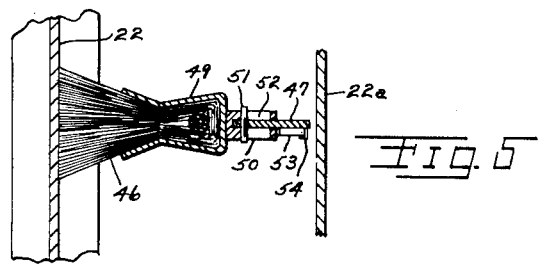
INVENTOR.
CHRISTIAN W. SAVITZ
BY
Hyde, Meyer, Baldwin & Doran
ATTORNEYS Dec. 22, 1953 C. W. SAVITZ 2,663,380
ROTARY ELECTROSTATIC FILTER
Filed March 14, 1951 5 Sheets-Sheet 5
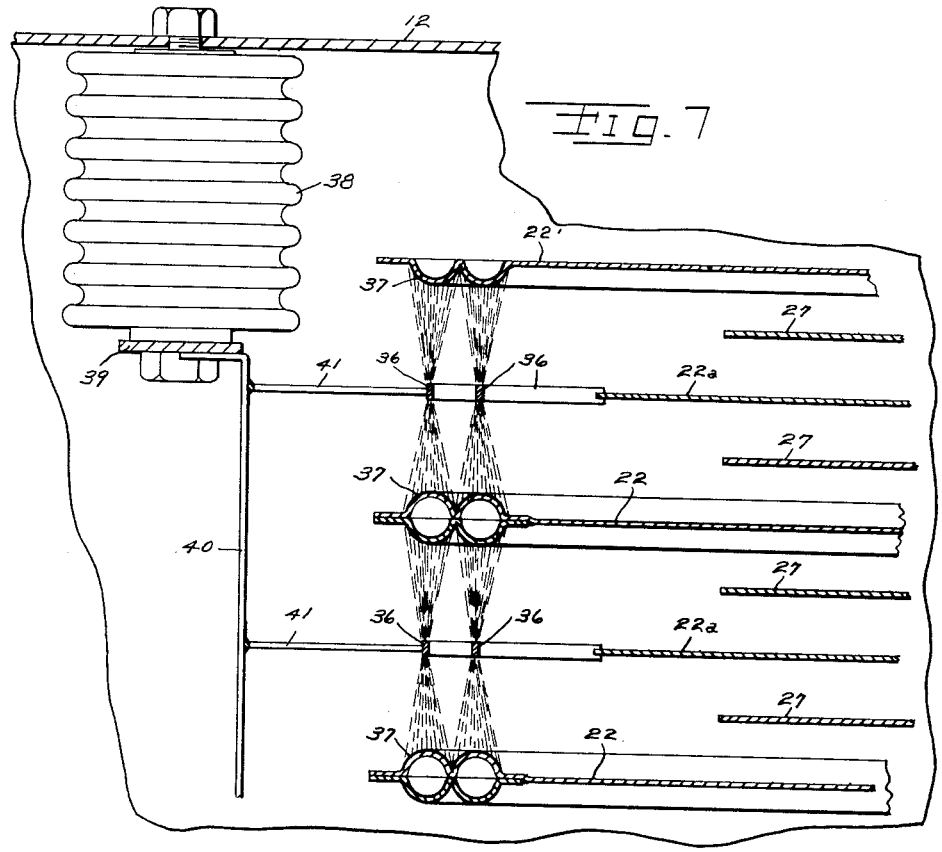
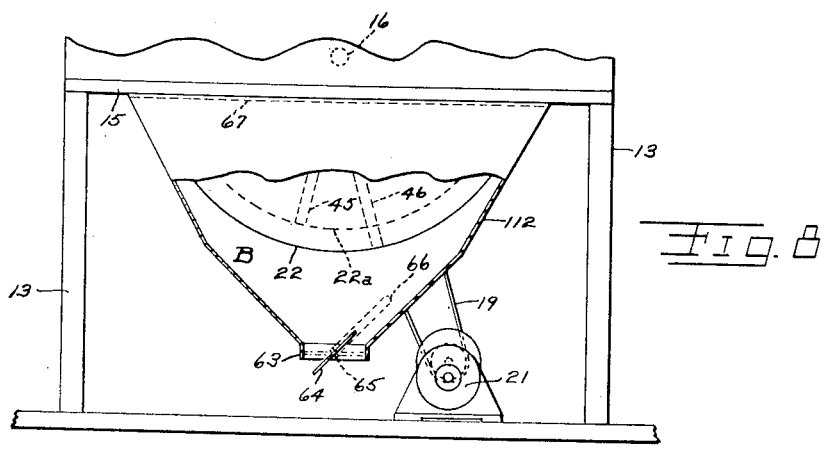
INVENTOR.
CHRISTIAN W. SAVITZ
BY
Hyde, Meyer, Baldwin & Doran
ATTORNEYS Patented Dec. 22, 1953

2,663,380

UNITED STATES PATENT OFFICE 2,663,380

ROTARY ELECTROSTATIC FILTER

Christian W. Savitz, South Euclid, Ohio, assignor to Air-Maze Corporation, Cleveland, Ohio, a corporation of Delaware Application March 14, 1951, Serial No. 215,452

7 Claims. (Cl. 183—7)

This invention relates to improvements in electrostatic filters and more particularly to a self-cleaning type of filter wherein the collector plates upon which the particles are gathered out of the gaseous stream are moved from a filtering zone into a filter cleaning zone where the particles are removed, after which the collector plates return to the filtering zone.

One of the objects of the present invention is to provide an electrostatic filter adapted to remove rather heavy concentrations of particles from a gaseous stream, which is facilitated by the steady movement of the dirty portion of the collectors to a cleaning zone and back to the filtering zone so as to always present reasonably clean collector plates in the filtering zone.

Another object of the present invention is to provide a series of parallel collector plates mounted on a shaft for rotation, whereby the upper portion of the plates is continuously exposed to a stream to be filtered while the lower portion of the plates is moving through a cleaning zone.

A further object of the present invention is the provision of a filter of the type described in the preceding paragraph wherein circular collector plates are movably mounted alternately between fixed generally semi-circular collector plates with the supply of high voltage electricity of one sign to the fixed plates and of the opposite sign to the movable plates.

The preferred embodiment of the invention also provides arcuate ionizing electrodes positioned between said movable plates on the inlet side thereof, and more particularly a pair of electrodes spaced apart in the direction of stream travel and positioned as taught hereinafter so as to insure that each particle in the gaseous stream receives the maximum charge.

Other objects of the invention include novel arrangements for cleaning the collected particles from the collector plates, means for keeping the insulators clean, means for controlling the flow of the gaseous stream so as to compel practically all of the stream to flow near the collector plates, and other features of the invention for the purpose of more efficiently carrying out the objects of the invention as heretofore set forth.

In the drawings—

Fig. 3 is an enlarged fragmental sectional view taken along the same line generally as the line 2—2 from which Fig. 2 is taken, with all of the parts along the line of the view shown in full section whereas some of these parts are shown in side elevational view in Fig. 2.

Fig. 3a is a fragmental sectional view taken similarly to Fig. 3 and intended to fit at the bottom of the viewing shown in Fig. 3;

Fig. 4 is a fragmental sectional view taken along the line 4—4 of Fig. 3;

Fig. 5 is a fragmental sectional view enlarged taken along the line 5—5 of Fig. 3;

Fig. 6 is a fragmental sectional view taken along the line 6—6 of Fig. 2;

Fig. 7 is a fragmental sectional view enlarged taken along the line 7—7 of Fig. 6; while Fig. 8 is a view similar to the lower portion of Fig. 1 showing a modification.

Figure 1:
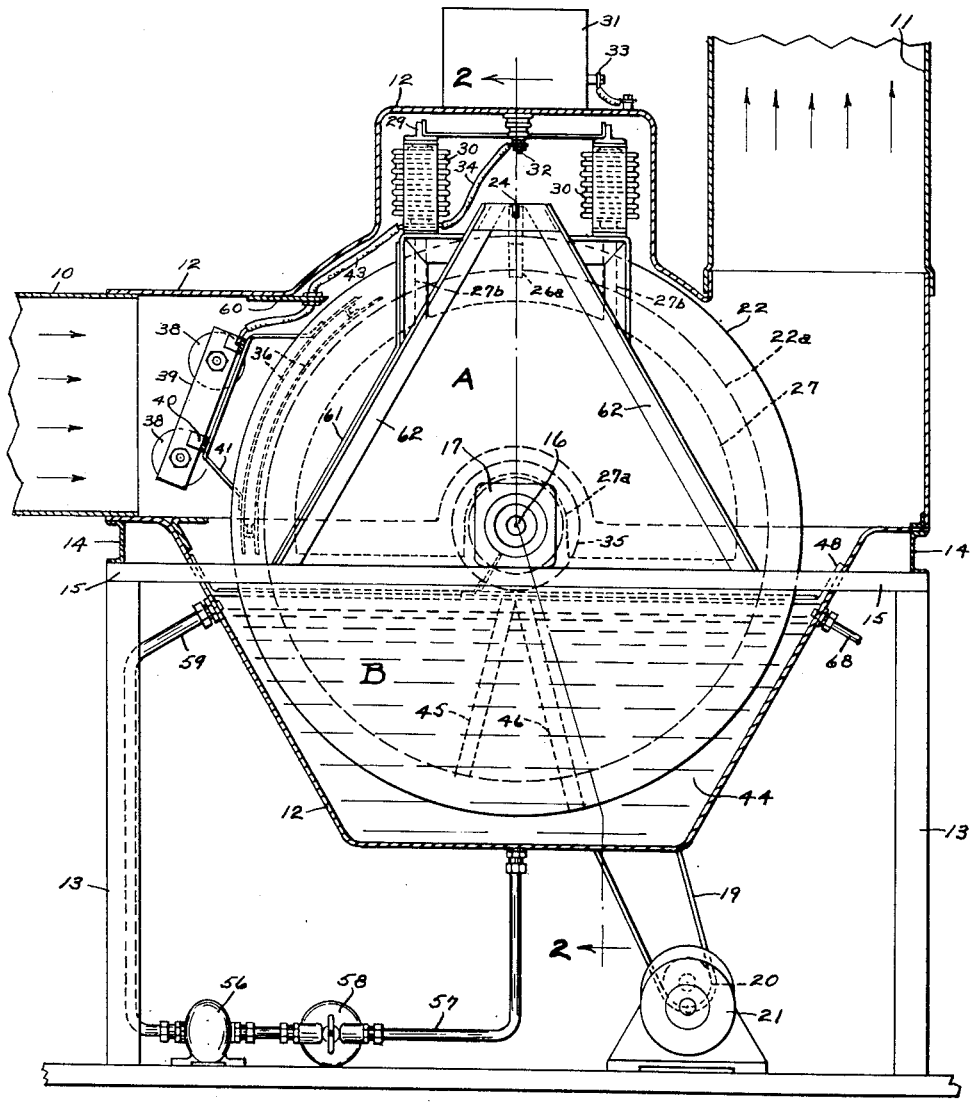
Fig. 1 is a sectional view through a duct and housing showing an end view of one embodiment of my improved electrostatic filter.

In the various views, 10 indicates an inlet duct for the dirty gaseous stream to be filtered, 11 indicates an outlet duct for the clean gaseous stream, while 12 indicates generally a housing or chamber means divided into a filtering zone and a filter cleaning zone. In the preferred embodiment as shown clearly in Fig. 1, the upper portion of the chamber means 12 is a filtering zone where charged collector plates attract particles from the gaseous stream, after which the plates are moved into the lower portion of the chamber means 20 where the particles are removed from the collector plates. The entire device is supported on a frame 13 which has cross frame members 14 and longitudinally extending frame members 15.

One means for moving the collector plates from the filtering zone A as indicated in Fig. 1 to the filter cleaning zone B is to mount these plates on a rotatable shaft 16 which is supported in bearing boxes 17 mounted on the frame members 15. A pulley 18 is fixed on one end of the shaft 16 and is driven by means of a belt 19 running to a pulley 20 on a motor 21 which is mounted on the base of the frame 13. Electric power means (not shown) is provided for causing rotation of pulley 20 by motor 21.

A set of collector plates 22 and 22a are mounted on shaft 16 for rotation therewith. The particular mounting means comprises a sleeve 23 which is rigidly connected, as by means of a key, to shaft 16 and the plates 22 and 22a are welded to the sleeve 23. As clearly seen in Figs. 2, 3 and 7, plates 22 are of greater diameter than the plates 22a for a purpose to be presently described. For the purpose of holding plates 22 and 22a steady during their rotation and for keeping them accurately spaced, a long bolt 24 extends from side to side of the housing 12 and on this bolt are secured, as by means of set screws 25, guides 26 for plates 22 and guides 26a for the plates 22a.

By means presently to be described, high voltage electricity of one sign is applied to the plates 22 and 22a and a set of fixed collector plates 27 is provided between each pair of plates 22 or 22a, to which is applied high voltage electricity of the opposite sign. The plates 27 are generally semi-circular in form as clearly shown in Figs. 1 and 6 and are preferably provided with a central opening 27a generally semi-circular in form about shaft 16 as will presently appear. These plates 27 are suspended from above. Each plate has two ears 27b extending upwardly, with their ends turned at right angles for attachment to two rods 28 which extend from side to side of the housing 12 stopping short of the sides thereof. The ears 27b may be secured to the bars or rods 28 as by welding. The bars 28 are suspended in an insulated manner in the housing 12. To this end, a pair of brackets 29 extend in parallel relation near the top wall of the housing 12 and from each of these brackets are suspended three insulators 30. The bars 28 are in turn suspended from the insulators.

For supplying power to the plates 27, a power pack 31 of known type is provided having a hot terminal 32 and a grounded terminal 33. The hot terminal 32 is connected by lead 34 to one or both of the bars 28 whereby all of the plates 27 are provided with high tension relatively unidirectional current and plates 22 and 22a are grounded through the sleeve 23 and shaft 16. Thus, there is a voltage gradient between each of the plates 27 and the plates 22 or 22a adjacent to it and the electrostatic forces are exerted in such a direction that the major portion of the charged particles are collected on plates 22 and 22a, from which means is provided for removing the particles as will presently appear.

To properly insulate each of the plates 27 from the central shaft 16, radially inwardly from each plate 27 is provided an insulator block 35 completely surrounding shaft 16 and sleeve 23 and filling the space between plates 22 and 22a. Each of these insulators has an outwardly extending annular rib 35a preferably provided with serrations so as to increase the leakage path for any electrical discharge. Each of the ribs 35a has an outwardly opening annular recess 35b adapted to snugly receive the inner edge of the plate 27. There is sufficient clearance at this point for the insulator 35 to rotate with shaft 16 while plate 27 remains stationary.

Means is provided for charging particles in the dirty stream as it comes in through the inlet 10. This charging means might take any one of various known forms and the collector plates and their cleaning means would operate in the manner hereinafter described. However, I prefer to utilize charging electrodes 36 formed arcuately about the center of shaft 16 and coacting with toroidal or parti-toroidal electrodes 37 formed on the plates 22. I contemplate utilizing a power pack 31 giving half wave rectification as explained in my copending application Serial No. 64,642, filed December 10, 1948, for Electrostatic Filter, and, for reasons more fully described in the above-mentioned copending application, I therefore provide two charging or ionizing electrodes 36 spaced apart in the direction of stream flow by a distance which measured in inches is approximately equal to V divided by $10f$ where V equals the average velocity of the stream in feet per minute and $f$ equals the frequency in the primary winding of the power pack 31 in cycles per second. In this manner, as taught in my copending application, any given particle in the dirty gaseous stream is approximately opposite one or the other of the charging electrodes 36 during a peak in the slightly pulsating wave delivered by the power pack 31.

Figure 2:
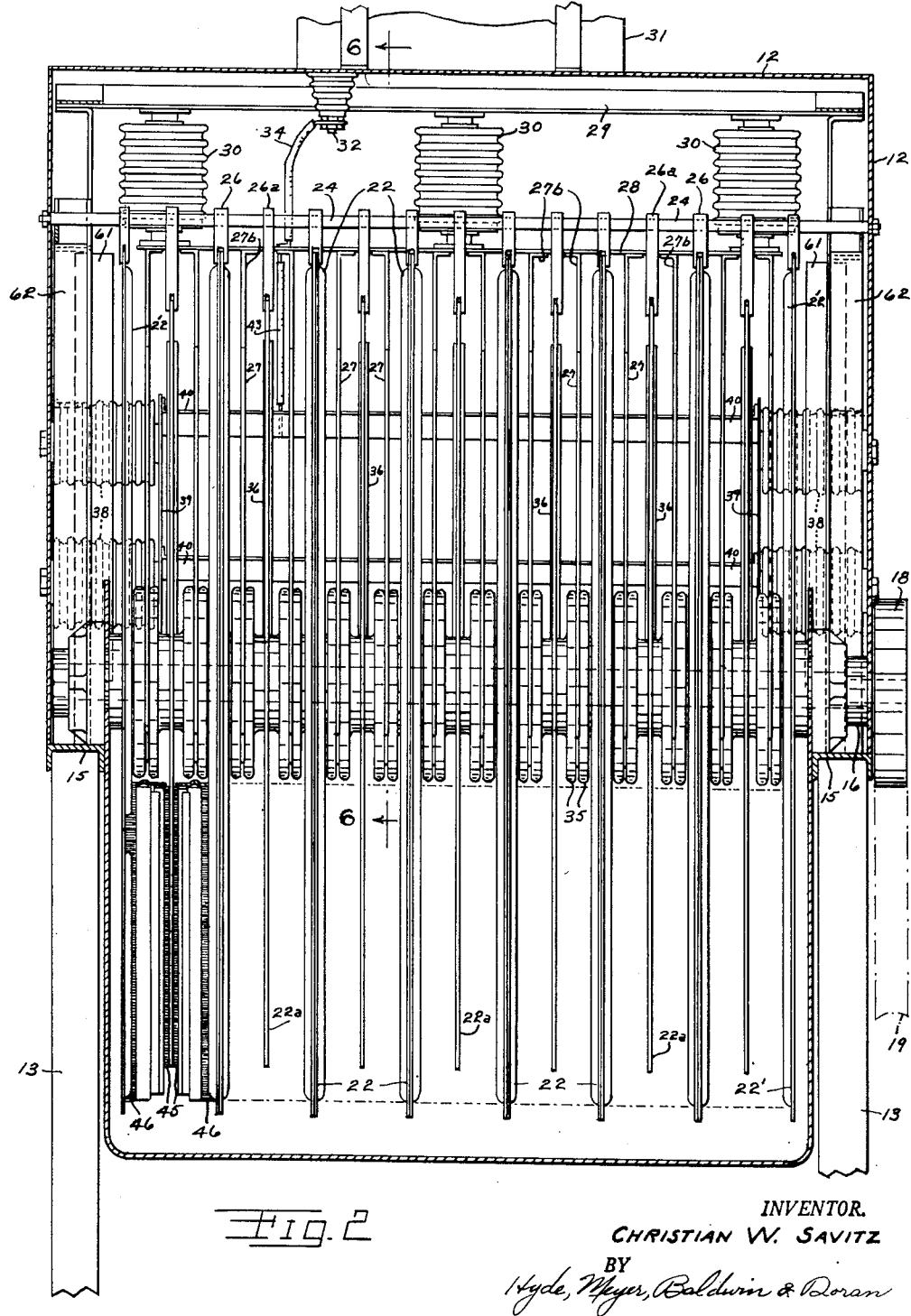
Fig. 2 is an enlarged sectional view taken along the line 2—2 of Fig. 1.

The toroidal electrodes 37 are formed near the peripheries of plates 22, as best shown in Figs. 3 and 7 by providing two parallel semi-toroidal ribs in plate 22 and welding thereto two semi-toroidal ribs in a plate 37a in registration with the toroidal ribs on plate 22. Referring to Fig. 2, the laterally outermost grounded plates 22' have a single semi-toroidal or parti-toroidal rib to provide a grounded charging electrode, for obvious reasons. Referring to Figs. 2 and 6, the supporting means for the arcuate charging electrodes 36 will now be described. Two pairs of axially aligned insulators 38 are mounted on the side walls of housing 12 so as to support end straps 39 to which are welded cross straps 40. As clearly shown in Fig. 7, midway between each pair of plates 22 a generally C shaped strap 41 (seen in side elevation in Fig. 6) is welded to straps 40 and also to one of the arcuate charging electrodes 36. The radially innermost charging electrode is then supported in spaced relation to the outer electrode by means of spacing brackets 42. Charging voltage is applied to electrodes 36, as clearly seen in Figs. 1 and 6 by an electrical conductor 43 connected between a conductor 34 and one of the straps 40 or 41. Conductor 34 is connected to hot terminal 32 so that the particles are charged with electricity of the same sign as that applied to plates 27. The conductors 34 and 43 are properly insulated from parts of the housing or other grounded parts. Any apparent connection between plates 22a and electrodes 36 as viewed in Fig. 7, is an optical illusion as the electrodes 36 are behind the plates 22a in that view. The electrodes 36 are spaced from the periphery of plates 22a as clearly shown in Fig. 6.

I prefer to use a liquid bath for cleaning the collected particles from plates 22 and 22a. As shown in Fig. 1, the lower portion of housing 12 is filled with such a liquid bath at 44 up to a level slightly below shaft 16. As plates 22 and 22a move clockwise in Fig. 1, impelled by motor 21, they are carried through the bath 44 and reappear in a cleansed state near the arcuate electrodes 36. A better cleaning result is obtained if some means is provided to agitate the liquid bath or the particles while the plates are passing through the bath 44. In the present embodiment I have shown brushes 45 and 46 for the purpose of rubbing the particles off of the plates. Preferably I provide a resilient mounting for the brushes so that they will be continuously pressed against the plates which they are intended to clean. As shown in Figs. 3, 3a and 4, each brush is supported by a metal strap 47 rigidly secured to a bar 48 which is part of the main frame. Each brush comprises a holder 49 having a U-shape bracket 50 secured to the back thereof in a manner to slidably embrace the bar 48 as clearly shown in Fig. 5. A pin 51 extends through a hole in bar 48 and through slots 52 in the member 50. At spaced points along each brush there is provided a leaf spring 53 held in a pin 54 mounted on bar 48, with the ends of the spring pressing against the member 50. In this manner, each brush is continuously urged toward the plate which it is intended to clean.

In Fig. 2, brushes 45 and 46 are shown at the left-hand end of the drawing and the position of these brushes across the rest of the view are indicated in dot-dash lines so as to avoid confusion in the drawing.

Preferably, means is provided to keep the insulators 35 clean. As clearly shown in Figs. 3 and 4 rubber fingers 55 are mounted on the member 48 between each pair of insulators 35. The edges of the fingers 55 correspond to the contours of the insulators 35 so as to clean every portion of them. Stiffening ribs 55a may be formed in the rubber-like material so as to insure a good wiping job.

The operation of this form of my device should now be apparent. With power supplied to the pack 31 from a suitable source, and with motor 21 operating, plates 27 are charged with voltage of one sign while plates 22 and 22a are provided with voltages of the opposite sign. In like manner, the charging electrodes 36 are receiving the proper voltage from the source in power pack 31. A dirty gaseous stream entering through the duct 10, passes over the charging electrodes 36 or rather between these electrodes and the adjacent toroidal or parti-toroidal electrodes 37, as clearly seen in Fig. 7. All particles in the dirty gaseous stream are here charged as they pass between the electrodes 36 and 37. The gas flow is then across the upper portions of plates 22, 22a and 27 and out the discharge duct 11. The charged particles are thus caught upon the collector plates, mostly upon the plates 22 and 22a. These plates pass into the bath 44 which may be of dielectric material or it may be water since plates 22 and 22a are grounded. Here the plates are cleaned both by the liquid of the bath and by the scrubbing action of the brushes 45 and 46. The cleaned plates come upwardly out of the bath at the left-hand side of Fig. 1, as the plates 22 and 22a turn in a clockwise direction. The cleanest plates are thus always presented nearest to the charging electrodes 36.

Means may be provided for keeping the bath 44 clean. For this purpose I have shown a pump 58 mounted on the base of the frame and connected by suitable conduit 57 to the lower portion of the bath 44. A filter 58 is imposed on this inlet line so as to filter all dirty particles out of the liquid in the bath 44. The discharge from pump 58 passes through line 59 back into the bath 44. The filter 58 may be cleaned periodically.

I provide suitable baffling means so as to insure that practically all of the gaseous stream passes near the plates 22, 22a and 27. To this end, a baffle 60 extends entirely across the width of duct 10 just above the charging electrodes 36 so as to prevent any large amount of the gaseous stream bypassing the collector plates over the top thereof. Other baffle strips 61, best seen in Figs. 1 and 2, are secured to frame members 62. These strips 61 come as close as possible to the end collector plates 22' so as to prevent any substantial by-passing of unclean gases laterally around the entire set of collector plates. Obviously, any particles passing near the plates 22' will be deposited thereon, provided the particles are properly charged.

In the modification shown in Fig. 8, I have indicated how the plates 22 and 22a may be cleaned without using liquid. All of the parts of this modification are intended to be like those previously described except those which I will now specifically mention. The housing 112 extends downwardly in a hopper-like form and is provided with an opening 63 at the bottom which is normally closed by a gate 64 mounted on a pivot 65 and operable by means of a handle 66 located on the far side of the hopper. Suitable baffle means 67 is provided between all plates 22 and 22a where they pass from the filtering zone A to the filter cleaning zone B. Brushes 45 and 46 may be provided to wipe the plates as in the first described form or high pressure fluid jets might play upon the plates to dislodge the particles. By tilting the gate 64 the dirt may be discharged from the hopper 112 from time to time.

In the first described form, if bath 44 is not of dielectric material, an overflow 68 may be provided at the upper level of the bath to insure a safe spacing of the bath below charged plates 27.

What I claim is:

1. An electrostatic filter for removing particles borne in a gaseous stream and comprising duct means having an inlet and outlet, a liquid bath reservoir below and adjacent said duct means between said inlet and outlet, a shaft extending across said duct means just above said reservoir, said shaft being at right angles to the general direction of gas flow, a plurality of circular collector plates mounted in laterally-spaced parallel relationship on said shaft, means for rotating said plates on said shaft whereby to carry portions of said plates from said duct means and through said reservoir and back to said duct means, a particle charging electrode mounted between a pair of said plates near the periphery thereof and in said duct means near said inlet, said particle charging electrode being arcuate about the same center as said circular collector plates, a fixed collector plate mounted between and parallel to each pair of circular collector plates and insulated therefrom, and means for supplying a high potential direct current of one sign to said charging electrode and to said fixed collector plate and for providing high potential of opposite sign to said circular collector plates.

2. The combination of claim 1 including means effective in said reservoir for loosening particles from said circular collector plates.

3. The combination of claim 1 including additional circular collecting plates alternately placed between said first-named circular collecting plates, means supplying high electrical potential of said opposite sign to said additional collecting plates, said electrical potential being of substantially equal voltage on all of said circular collecting plates, said additional circular plates being of less radius than said first-named circular plates, and other of said fixed collector plates being provided between each circular plate of lesser radius and the adjacent first-named circular plates of greater radius.

4. The combination of claim 1 wherein each of said circular collecting plates has an annular parti-toroidal ring convex toward said charging electrode, and said charging electrode is arcuately formed about substantially the same center as said ring with approximately the same radius as said ring.

5. The combination of claim 1 wherein each said fixed collector plate is substantially semi-circular and concentric with said first named circular plates and of less radius than said first named plates.

6. The combination of claim 5 wherein each said fixed collector plate has a substantially semi-circular opening adjacent said shaft, electrical insulators surrounding said shaft radially inwardly from said semi-circular plates, said insulators having peripherally extending grooves opening radially outwardly, and the inner edges of said semi-circular plates sealingly seated in said grooves.

7. The combination of claim 1 including a chamber directly above said circular collector plates and communicating with said duct means, said duct means including portions positioned close to the periphery of said circular collector plates across all of said collector plates and substantially preventing by-passing of said gaseous stream around the top of said collector plates, electrical connector means in said chamber and communicating with said fixed collector plates for supplying electrical potential thereto.

CHRISTIAN W. SAVITZ.

References Cited in the file of this patent

UNITED STATES PATENTS

| Number | Name | Date |
| --- | --- | --- |
| 2,383,112 | Dahlman | Aug. 21, 1945 |

FOREIGN PATENTS

| Number | Country | Date |
| --- | --- | --- |
| 713,691 | France | Aug. 17, 1931 |